(12) United States Patent
Bauerle et al.

(10) Patent No.: US 6,564,127 B1
(45) Date of Patent: May 13, 2003

(54) DATA COLLECTION VIA A WIRELESS COMMUNICATION SYSTEM

(75) Inventors: Paul Alan Bauerle, Fenton, MI (US); Kenneth Paul Dudek, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/695,271

(22) Filed: Oct. 25, 2000

(51) Int. Cl.$^7$ .................................................. G06F 7/00
(52) U.S. Cl. ........................... 701/33; 701/24; 340/991; 340/993
(58) Field of Search ........................ 701/33, 24, 117; 340/991, 993, 825.72; 455/456, 66, 414, 425

(56) References Cited

U.S. PATENT DOCUMENTS

| | | | | |
|---|---|---|---|---|
| 5,473,540 A | * | 12/1995 | Schmitz | 701/1 |
| 5,717,387 A | * | 2/1998 | Suman et al. | 340/7.2 |
| 5,771,455 A | | 6/1998 | Kennedy, III et al. | 455/456 |
| 5,987,394 A | * | 11/1999 | Takakura | 701/1 |
| 6,006,159 A | * | 12/1999 | Schmier et al. | 340/988 |
| 6,028,537 A | * | 2/2000 | Suman et al. | 340/988 |
| 6,128,559 A | * | 10/2000 | Saitou et al. | 340/436 |
| 6,141,611 A | * | 10/2000 | Mackey et al. | 340/438 |
| 6,161,071 A | * | 12/2000 | Shuman et al. | 340/436 |
| 6,185,487 B1 | * | 2/2001 | Kondo et al. | 701/1 |
| 6,236,365 B1 | * | 5/2001 | LeBlanc et al. | |
| 6,246,932 B1 | * | 6/2001 | Kageyama et al. | 701/24 |
| 6,278,939 B1 | * | 8/2001 | Robare et al. | 342/357.01 |
| 6,311,128 B1 | * | 10/2001 | Prum et al. | 324/331 |

* cited by examiner

Primary Examiner—William A. Cuchlinski, Jr.
Assistant Examiner—Olga Hernandez
(74) Attorney, Agent, or Firm—Christopher DeVries

(57) ABSTRACT

A vehicle control system method and apparatus including a mobile application service provider communicating over a wireless communication network, a mobile station communicating with the mobile application service provider over the wireless communications network, and a vehicle controller communicating with the mobile station via an automotive communications network, and where the mobile application service provider accesses vehicle data and transfers the vehicle data to the mobile application service provider to be utilized by the mobile application service provider or another information provider.

5 Claims, 2 Drawing Sheets

DATA COLLECTION VIA A WIRELESS COMMUNICATION SYSTEM

TECHNICAL FIELD

The present invention relates to the wireless transfer of data located on remote devices. More specifically, the present invention relates to a method and apparatus of transferring information from a vehicle, via a wireless communication system, to a central database or information system/provider for analysis and distribution.

BACKGROUND OF THE INVENTION

Presently, automotive companies integrate numerous sensors into a vehicle control system to modify engine control parameters, determine vehicle speed, or other similar functions. For example, a temperature or humidity sensor can be used to improve the performance of various powertrain control systems such as spark control, air fuel ratio, exhaust gas recirculation, etc. Furthermore, wheel speed sensors provide speed feedback to engine control systems and the operator of the vehicle to control the speed of a vehicle. These sensors collect valuable data that can be used outside a vehicle for various purposes.

The development of wireless telecommunications has enabled the provision of mobile application services to vehicles by mobile application service providers such as GM OnStar®. Such services include providing call-in service for a global positioning system, automatic notification of supplemental inflatable restraint activation, activation with dispatch of emergency services, etc. The present invention utilizes a wireless telecommunications/telematics system to transfer vehicle data such as vehicle process variables to be analyzed and distributed by a central information provider.

SUMMARY OF THE INVENTION

In accordance with the teachings of the present invention, a method and apparatus is provided for using a wireless telecommunications/telematics system such as a cellular phone system or a satellite communication system to transfer data from a vehicle to an information system/provider remotely located from the vehicle.

In the method and apparatus of the present invention, embedded mobile stations such as cellular phones, radio transceivers, or satellite communication devices are provided in a vehicle to communicate to a mobile application service center (MASC) such as utilized by the OnStar® service or a similar information system/provider. It should be understood that the MASC is used in the preferred embodiment of the present invention, but any centralized information service or computer system with wireless communication/telematics capabilities is considered within the scope of the present invention. The embedded mobile station is equipped with a global positioning system (GPS) receiver that can accurately determine the current position of the vehicle. The embedded mobile station is also connected to an automotive communication network such as IES-CAN, GMLAN, J1850, and J1939 to communicate with an engine control module (ECM), a powertrain control module (PCM), a transmission controller, a body computer, or other vehicle controller to access vehicle data.

The GPS located in the embedded mobile station will provide vehicle location information to the MASC. The MASC will query the mobile station for sensor information such as the temperature outside the vehicle, the humidity outside the vehicle, the barometric pressure outside the vehicle and vehicle speed, but is not limited to such. Any vehicle sensor data or data in the vehicle which may be transmitted from the embedded mobile station to the MASC is considered within the scope of the present invention.

The MASC will process the sensor data and vehicle data to provide for the generation and processing of information that may be sold to outside sources or transmitted to the mobile station. For example, the environmental sensor data generated by the sensors in the vehicle and then transmitted to the MASC may be resold to providers of weather information, including weather agencies having access to the worldwide web/Internet. The GPS located on the embedded mobile station will provide location information for the corresponding environmental sensor data, thus providing highly accurate local environmental readings corresponding to the location of the vehicle. In alternate embodiments of the present invention, cells in a cellular communication system can provide vehicle location corresponding to the cell in which the embedded mobile station is communicating.

Other vehicle data such as vehicle speed data is also highly valuable for analysis and distribution by the MASC or information provider. Vehicle speed information transmitted from the embedded mobile station can be used to indicate traffic conditions. For example, the GPS or cellular communication system will indicate the location of the vehicle. The location information in combination with the vehicle speed information and a digital map can provide a snapshot of current traffic conditions for a particular thoroughfare or stretch of road. The digital map may be located in the MASC or stored in the vehicle, depending on the capabilities of the MASC and the vehicle electronics. This traffic information can then be communicated to other vehicles equipped with an embedded mobile station to signal traffic conditions, enabling the operators to determine or alter travel in response to traffic conditions.

In a further embodiment of the present invention, a method that partners cellular network providers, navigation information providers, and vehicle telecommunications/telematics suppliers may be used. The method is based on the use of excess capacity (i.e., dead time) in a cellular network. Excess capacity in a cellular network is a perishable commodity, and cellular network providers are able to track this excess capacity in any particular cell. As such, cellular networks may acquire vehicle data using this excess capacity to transfer vehicle data to the MASC or information provider at a very low cost. Revenue may then be shared by the cellular service provider and the information provider as determined by the parties involved. Thus, the excess capacity that would normally be lost now generates revenue, providing a benefit to the cellular service provider and the MASC or information provider.

BRIEF DESCRIPTION OF THE DRAWINGS

The various advantages of the present invention will become apparent to one skilled in the art upon reading the following specification and by reference to the drawings in which.

DESCRIPTION OF THE PREFERRED EMBODIMENT

Figure 1:
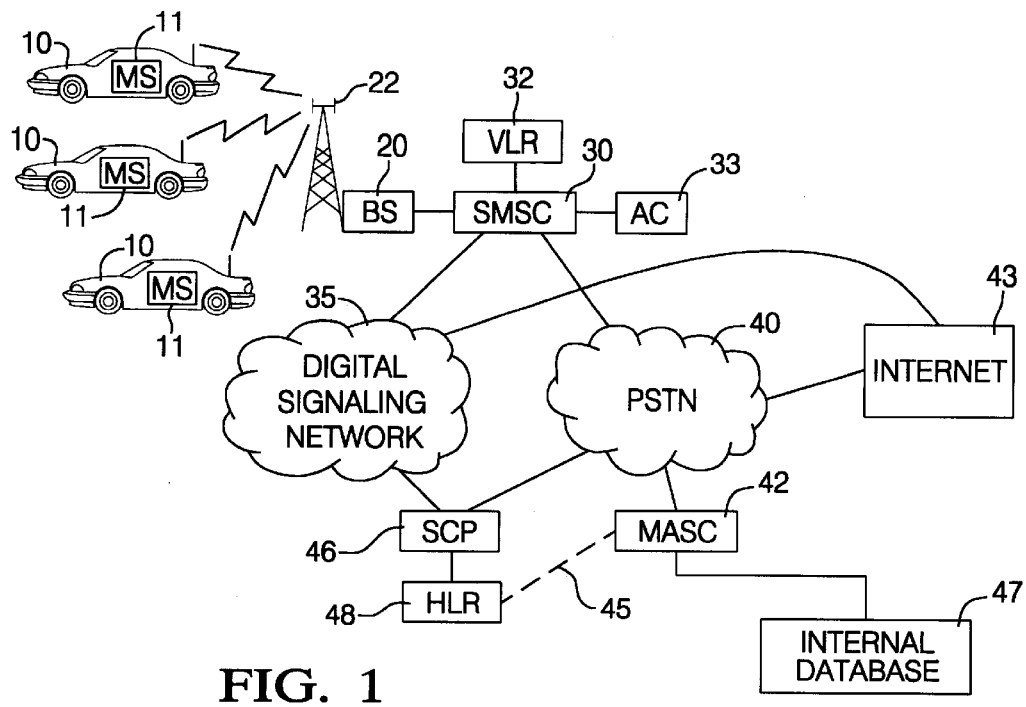
FIG. 1 is a schematic diagram of a mobile application service network providing mobile application services to mobile stations in vehicles through a wireless telecommunications network.

FIG. 1 shows a network model of a mobile application service network using a wireless telecommunications/telematics network. The model shows function entities in a manner consistent with specification ANSI/TIA/EIA-41 ("IS-41"); the actual apparatus used is known to those skilled in the art, except as described herein.

Referring to FIG. 1, vehicles 10 are mobile—either self-propelled (a motor vehicle) or propelled by another (a trailer). The vehicle(s) 10 is provided with an embedded mobile station (MS) 11 capable of two-way communication via electromagnetic waves such as radio waves with a base station (BS) 20 (as used in a cellular communication system), having an antenna 22, or linked to a satellite communication system. The MS 11 communicates with the BS 20 within a limited coverage area around the BS 20, as well as any other base stations as it moves through their limited coverage areas. When a satellite is used to communicate with the MS 11, the coverage area will vary to reflect the satellite coverage. The BS 20 is connected by land communication lines to a mobile switching center (MSC) which, because it is shown as currently serving MS 11, will be referred to as the serving mobile switching center (SMSC) 30.

The BS 20 (or satellite and satellite base station) and the SMSC 30 are operated by a wireless telecommunications service provider in a defined geographic service area. The SMSC 30 is part of a wireless telecommunications network providing mobile stations such as the MS 11 communication capability with other stations, either mobile or stationary. In the preferred embodiment, the MS 11, BS 20, and SMSC 30 preferably operate in the cellular license band, but they are not limited to such operation; the personal communications (PCS) band and others are alternatives.

In addition to the BS 20 and SMSC 30, the wireless telecommunications network comprises at least a digital signaling network 35 (ISDN, SS7, X-25) capable of carrying IS-41 data messages and a public switched telephone network (PSTN) 40 or wide-area network (WAN) capable of carrying voice and data transmissions. The digital signaling network 35 and PSTN 40 extend over a large geographical area (potentially all of North America or the globe) over which mobile application services are provided to moving vehicles. The SMSC 30 is further connected to a visitor location register (VLR) 32 containing temporary location, status, and service information concerning the MS 11 and other mobile stations registers as visitors with the SMSC 30. The SMSC 30 may optionally be connected to an authentication center (AC) 33 for performing authentication functions relative to mobile stations, including the MS 11, attempting access thereto.

The MS 11 is a subscriber to a mobile application service provider having a mobile application service center (MASC) 42 connected to the wireless telecommunications network via the PSTN 40. The mobile application service provider is a business concern that provides mobile application services to vehicles via the wireless telecommunications network. These mobile application services may include vehicle operator call-in services such as providing GPS-determined vehicle location data or providing data transfer such as downloading traffic, weather or environmental data. The provider of these application services may or may not be also a provider of a telecommunications network in the network itself. In the preferred embodiment, the mobile application service provider is a manufacturer of vehicles and provides these services, as well as the embedded mobile station used in providing the data and services, to the purchaser and other operators of those vehicles.

The MASC 42 is operated by the mobile application service provider and includes communications stations staffed by operators who receive calls to MASC 42 from MS 11 and other mobile stations and/or automated computer systems which respond to calls from MS 11. The MASC 42 also communicates with government and emergency service providers, and any other similar brokers of information in order to provide the mobile application services requested or required by the operators and systems of the vehicle 10 and other vehicles having embedded mobile stations.

The MASC 42 also provides and maintains a home location register (HLR) 48 connected via a service control point (SCP) 46 to the digital signaling network 35 and the network PSTN 40. HLR 48 contains subscriber profile data for all embedded mobile stations, the data including such information as the MS 11 location, subscriber status, call restrictions and directory numbers. If more than one physical home location register is provided, each one will contain the basic subscriber data, including call restrictions for all subscribers. A separate communication link, indicated by dashed line 45 in FIG. 1, may be provided between the HLR 48 and the MASC 42 to facilitate data flow in providing enhanced mobile application services.

In a first operation, the MASC 42 will query a number of vehicles 10 in specific geographical areas to transfer vehicle data such as environmental, position and vehicle speed data to the MASC 42 from the MS's 11. In alternate embodiments of the present invention, the MS's 11 in the vehicles 10 will automatically transfer vehicle data to the MASC 42 according to an internal clock or startup condition. As described previously, a GPS 55 and/or cell in a cellular communication system will provide vehicle location data. Environmental, vehicle speed and other vehicle data provided by sensors on the vehicles 10 transmitted to the MASC 55 will be averaged (or processed by a statistical method) to provide an accurate snapshot of environmental conditions and/or traffic conditions in which the vehicles 10 are located. The environmental data can be sold to various information providers such as weather agencies to provide a continuously updated picture of environmental conditions that correspond to the location of the vehicles. The present invention provides a highly accurate picture of environmental conditions generated by mobile sensors that are superior to the readings of a small number of static sensors presently used by weather agencies.

Traffic conditions are also a highly desirable piece of information that may be furnished to consumers or sold to information providers. As previously described, a sampling of vehicle speed and position from a number of vehicles 10, via a wireless telecommunication system, can provide traffic information. For example, when a certain number of vehicles 10 on a specific road are traveling at a speed that is much lower than the speed limit, it can be predicted that less than favorable traffic conditions exist on that road. The road is identified by cross-referencing vehicle location data with an internal database 47 in the MASC 42 or a database in the vehicle 10 having maps and speed limits that correspond to the vehicle position information, as determined by the GPS 55 or cellular communication system. An operator can easily query the MASC 42 to determine where less than favorable traffic conditions exist on a certain road to determine travel plans.

Costs of using the cellular system to access vehicle data may become prohibitive, depending on the service provider, the market, coverage, and various other factors. Accordingly, a method is needed that enables the transfer of vehicle data via a wireless telecommunication system to an information service provider at reasonable cost. As previously described, excess capacity in a cellular network is a perishable commodity. This excess capacity is monitored by a cellular service provider and may be used to transmit vehicle data to the MASC 42 or another information provider. Revenue may then be shared by the cellular service provider and the owner of the MASC 42 as determined by the parties involved. Accordingly, the excess capacity that would normally be lost now generates revenue, providing a benefit to the cellular service provider and the MASC 42 or information provider.

Figure 3:
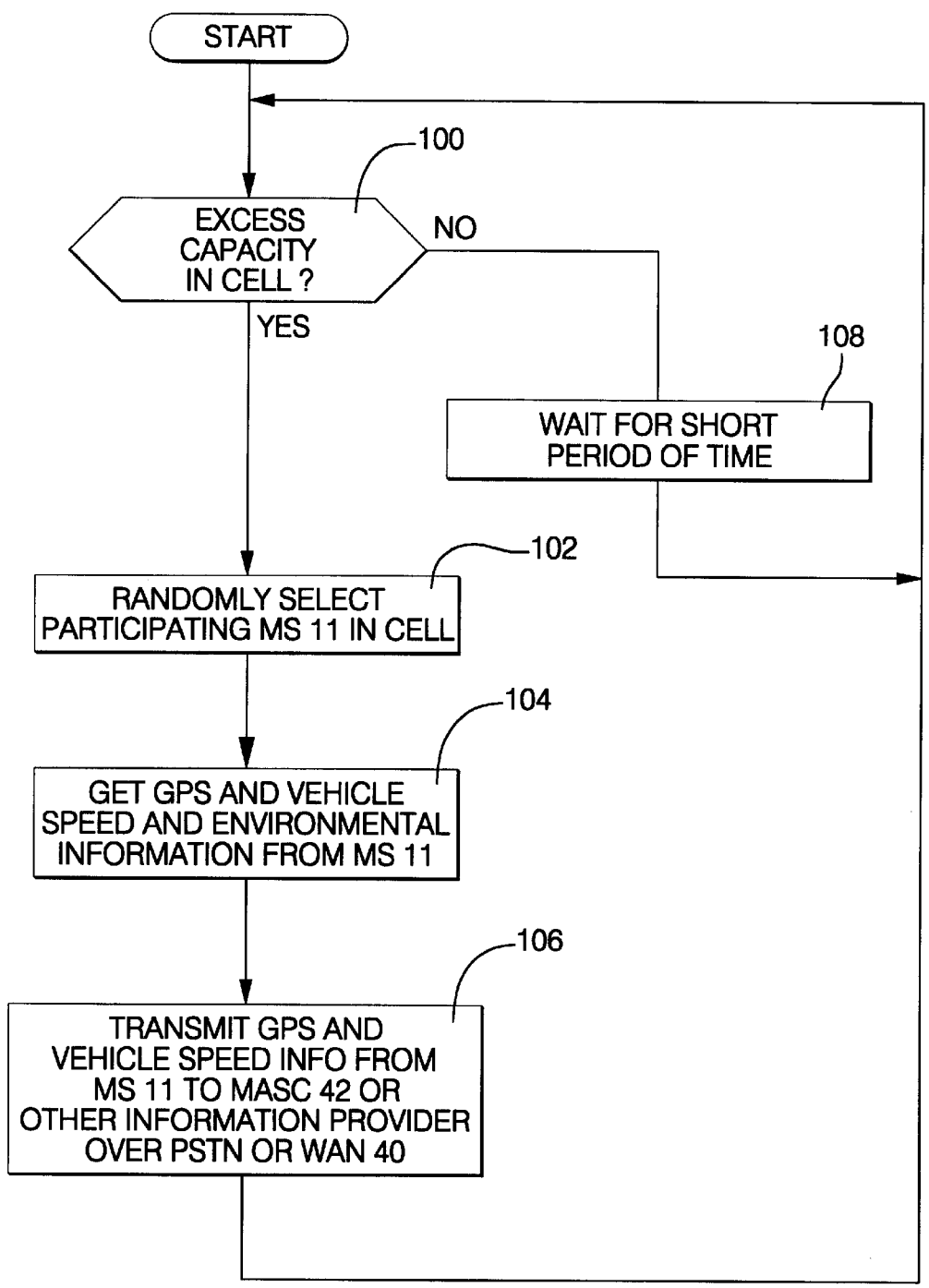
FIG. 3 is a flowchart of the method of the present invention for providing for transmission of vehicle data over excess capacity in a cellular network.

Referring to FIG. 3, the preferred method of determining excess cell capacity and transferring vehicle data is shown. Starting at block 100, the cellular provider will determine if there is excess capacity in a particular cell of interest. If there is no excess capacity, then at block 108 the cellular provider will wait for a certain period of time and then return to block 100 to determine if excess capacity is available. If there is excess capacity in the cell of interest, the cellular provider will randomly select participating MS's 11 in the cell to query at block 102. Continuing to block 104, the cellular provider will request and upload GPS and vehicle speed and/or environmental information from the MS's 11. It should be understood that while vehicle position, vehicle speed, and environmental information are specifically disclosed as being uploaded by the cellular provider, any other vehicle data is considered within the scope of the present invention. At block 106, the vehicle data is uploaded/transmitted from the MS's 11 to the MASC 42 or other information provider via the PSTN or WAN 40. The vehicle data may then be processed by the MASC 42 to be analyzed and/or distributed to other information providers or the MS's 11.

Figure 2:
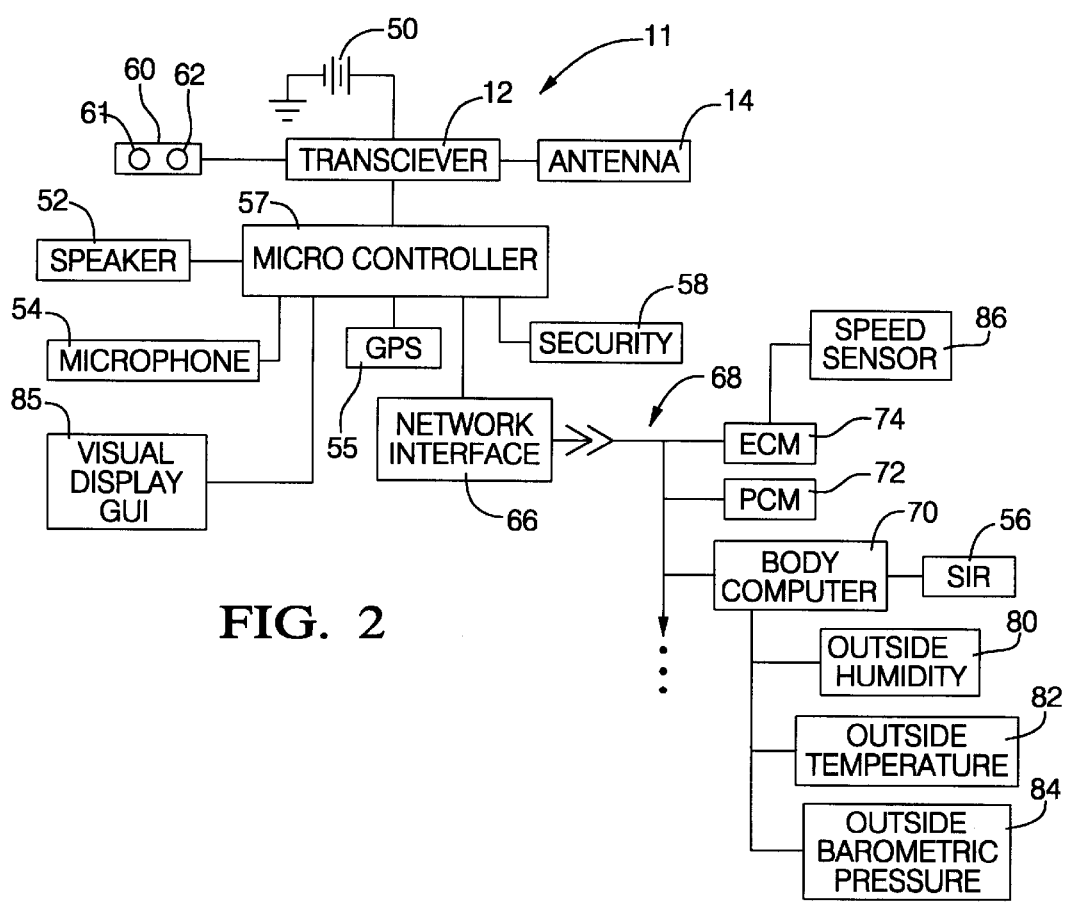
FIG. 2 is a block diagram of a mobile station for use in the network of FIG. 1.

The MS 11 is shown with its vehicle interfaces in FIG. 2. The heart of the MS 11 is transceiver 12, which is manufactured by or to the specifications of the mobile application service provider and is provided by the mobile application service provider to be installed as an embedded unit within the vehicle 10. It may be installed by the mobile application service provider itself, by an automotive dealer, or by another installer on behalf of the mobile application service provider. The word "embedded" means that it is installed in the vehicle and intended for use in the provision of application services provided to the vehicle, and further means that it is a subscriber of mobile application services provided. In the preferred embodiment, the transceiver 12 is technically capable of operation in either the "A" or the "B" portions of the cellular band, but mobile stations using the PCS band and satellite transmissions are considered within the scope of the present invention. The transceiver 12 is provided with identification data comprising a non-geographic, dialable, mobile identification number (MIN) and an equipment serial number (ESN), and this data is stored in the HLR 48 as part of its profile data.

The transceiver 12 is provided with electric power from a DC electric power supply 50, which may be the normal vehicle DC power supply or a supplemental DC power supply, and is connected by an RF connection to antenna 14. A control and interface microprocessor/microcontroller 57 provides interfacing and coordination with vehicle systems and accessories. For example, a speaker 52 and microphone 54 are used for voice communication to and from transceiver 12. A visual display or graphical user interface (GUI) 85 is also provided to allow access to visual information and visual interaction. Other accessories and monitored vehicle systems may provide digital data through microcontroller 57 to transceiver 12. For example, the GPS receiver 55 which includes an antenna (not shown) provides vehicle position information used by MASC 42 to locate the vehicle 10. Supplemental inflatable restraint (SIR) 56, temperature sensor 80, humidity sensor 82, and barometric pressure sensor 84 are linked to a body computer 70 or other computer/controller communicating on an automotive communication network 68 linked to the microcontroller 57, via a network interface 66.

The network interface 66 provides the MS 11 with the ability to transfer information to and from the various controllers on the vehicle such as an engine control module (ECM) 74, having a speed sensor 86, a powertrain control module (PCM) 72, and the body computer 70. The automotive communications network 68 network is preferably GMLAN but may comprise any known automotive communications network. The embedded mobile station described in this paragraph may be essentially the same as already used in the commercially available GM OnStar® system.

The ECM 74, PCM 72, and/or body computer 70 have numerous sensor inputs such as those previously described to control various devices in the vehicle 10. The ECM 74, PCM 72, and/or body computer 70 may transmit the raw sensor data or processed data to the microcontroller 57 for transmission by the transceiver 12 to the MASC 42. The sensor data may be scaled, qualified as valid and processed in any other manner known in the art. For example, vehicle speed and engine run time could be used to accept or reject a given sample of external air temperature generated by sensor 82. The MASC 42 further transmits processed information such as the traffic warnings previously described to the transceiver 12 for use by the operator of the vehicle 10.

While this invention has been described in terms of some specific embodiments, it will be appreciated that other forms can readily be adapted by one skilled in the art. Accordingly, the scope of this invention is to be considered limited only by the following claims.

What is claimed is:

1. A vehicle control system comprising:
    a mobile application service provider communicating over a wireless communication network;
    a mobile station communicating with said mobile application service provider via said wireless communications network;
    a vehicle controller communicating with said mobile station via an automotive communications network;
    wherein said mobile application service provider accesses vehicle data on said vehicle controller and transfers said vehicle data to a computer system; and
    wherein said mobile application service provider determines the excess capacity of a cell in a cellular site in said wireless communications network and uses said excess capacity to transfer the vehicle data to a third party information provider.

2. The vehicle control system of claim 1 wherein said third party information provider is a weather service providing weather information to consumers.

3. The vehicle control system of claim 1 wherein said third party information provider is a provider of traffic information to consumers.

4. A vehicle control system comprising:
    a mobile application service provider communicating over a wireless communication network;

a mobile station communicating with said mobile application service provider via said wireless communications network;

a vehicle controller communicating with said mobile station via an automotive communications network;

wherein said mobile application service provider accesses vehicle data on said vehicle controller and transfers said vehicle data to a computer system;

wherein said vehicle data comprises vehicle speed; and wherein said mobile application service provider correlates said vehicle speed to a digital map including speed limits to generate traffic flow data.

5. A vehicle control system comprising:

a mobile application service provider communicating over a wireless communication network;

a mobile station communicating with said mobile application service provider via said wireless communications network;

a vehicle controller communicating with said mobile station via an automotive communications network;

wherein said mobile application service provider accesses vehicle data on said vehicle controller and transfers said vehicle data to a computer system; and wherein said vehicle data is sold to a third party information provider.

* * * * *